Patented Dec. 29, 1942

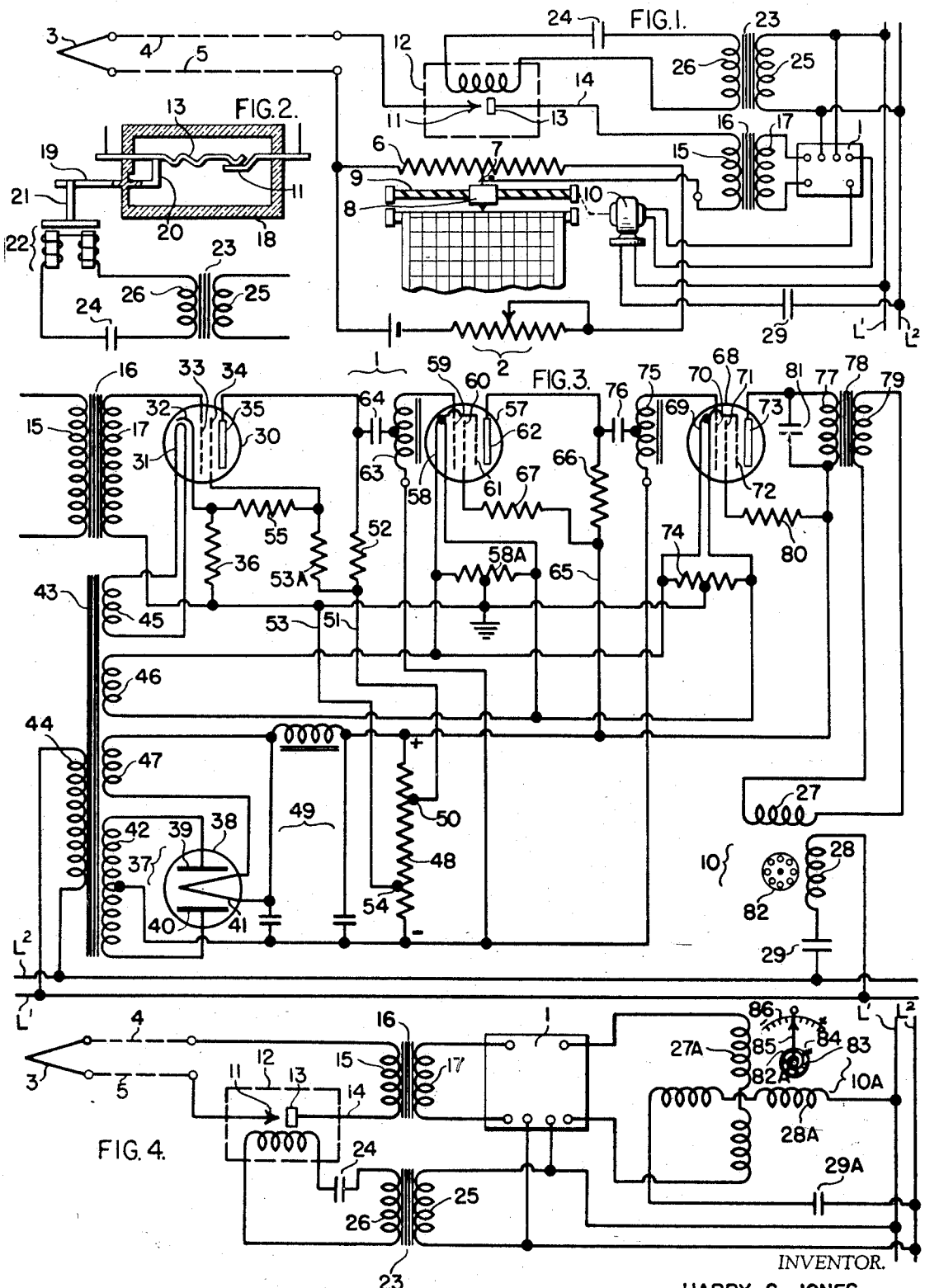

2,306,479

UNITED STATES PATENT OFFICE 2,306,479

MEASURING APPARATUS

Harry S. Jones, Washington, D. C., assignor to The Brown Instrument Company, Philadelphia, Pa., a corporation of Pennsylvania Application February 14, 1942, Serial No. 430,888

11 Claims. (Cl. 171—95)

The present invention relates to a new and improved method of and apparatus for making precise measurements of minute electrical currents or voltages.

A general object of the invention is to provide a novel method of eliminating the effects of stray electrical fields or spurious electrical effects upon the operation of apparatus designed for measuring the magnitude and the changes in magnitude of minute electrical currents or voltages.

A specific object of the invention is to provide a novel method of eliminating the effects of extraneously induced alternating currents upon the operation of measuring apparatus designed for making precise measurements of minute unidirectional electrical currents or voltages.

Another specific object of the invention is to provide a novel and desirable combination of means for measuring the magnitude and the changes in magnitude of minute electrical currents or voltages which inherently embodies provisions for eliminating the effects of stray electrical fields or spurious electrical currents upon the measurement obtained.

A more specific object of the invention is to provide a self balancing potentiometer instrument which may follow the approved practices of the art in respect to many of its features and which inherently embodies provisions for eliminating the effects of stray electrical fields or spurious electrical currents upon the operation of the instrument and thereby upon the measurement obtained.

A further specific object of the invention is to provide an improved instrument for measuring the magnitude and changes in magnitude of minute electrical currents or voltages which is energized by a source of alternating current, and which inherently embodies provisions for eliminating the effects of spurious electrical currents of the same frequency and of the same phase or of opposite phase as the source of alternating current upon the operation of the instrument and thereby upon the measurement obtained.

In accordance with a preferred embodiment of the present invention the minute unidirectional current to be measured is converted into an alternating current which may be readily amplified. The converting apparatus may desirably include means to produce pulsating current by periodically interrupting the unidirectional current to be measured and the pulsating current thus created is translated by suitable means such as an ordinary transformer into an alternating current which may be amplified by the use of suitable amplifying means. The amplified alternating quantity is applied to one phase winding of a two-phase device which may be an indicating electro-dynamometer or a reversible electrical motor, and a separate source of alternating current is applied to the second phase winding of the device through a phase shifting device which produces a shift of approximately 90°.

The converting apparatus is so arranged as to interrupt the minute unidirectional current to be measured as required to produce an alternating current in the output circuit of the transformer which is displaced 90° with respect to the alternating voltage of the separate source of alternating voltage referred to. In addition the amplifying means is so designed as to produce a phase shift of approximately 90° in the voltage amplified by it. As a result of the phase shifts produced by the converting apparatus and the amplifier, the alternating current component derived from the minute source of voltage under measurement and applied to the first mentioned phase winding of the two-phase device is displaced 90° with respect to the voltage applied to the second phase winding. The two-phase device therefore is actuated to an extent determined by the magnitude of the voltage derived from the minute voltage under measurement.

It is noted, however, that an extraneously induced voltage in the circuit including the minute unidirectional current under measurement of the same frequency as the separate source of alternating voltage and of the same phase or of opposite phase is not effective to operate the two-phase device. This desirable end is accomplished because of the phase shifts produced by the converting apparatus and the amplifier. The converting apparatus is so designed as not to produce a phase shift in the extraneously induced alternating current whereas the amplifier does produce a shift of 90° therein. Consequently, the voltage component derived from the extraneously induced alternating current which is applied to the first mentioned phase winding of the two phase device is in phase with the voltage applied to the second mentioned phase winding and is incapable of operating the two-phase device. In this manner the effects of stray electrical fields or spurious electrical effects which may be established by the energizing source of alternating voltage or by other sources of alternating voltage of the same frequency and of the same phase or of opposite phase and are effective to induce an alternating current in the circuit including the minute unidirectional voltage to be measured are eliminated.

Such spurious alternating currents are the ones most likely to be induced in the measuring circuit of the type described herein in a commercial installation and therefore, although the use of the present invention will not operate to eliminate the effects of all spurious electrical effects which may be introduced into the measuring circuit, it has especial utility and is decidedly advantageous.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawing:

Fig. 1 is a diagrammatic representation of the use of the present invention in a self balancing potentiometric recording system;

Fig. 2 illustrates in detail a form of interrupter that may be employed in the arrangement of Fig. 1;

Fig. 3 illustrates schematically a form of electronic amplifier that may be employed in the Fig. 1 arrangement; and Fig. 4 is a diagrammatic representation of the use of the invention in a deflectional type measuring system.

Referring to Fig. 1 of the drawing there is illustrated in schematic form an electronic device 1 shown in detail in Fig. 3 for producing effects in accordance with the extent of unbalance of a potentiometric network 2 which controls the electronic device. The potentiometric network 2 is unbalanced in accordance with variations in a quantity to be measured and because of the small magnitude of the unbalanced electromotive forces produced therein it is not practical nor desirable to have the said effects produced directly by the potentiometric network.

More specifically, an arrangement is illustrated in Fig. 1 for measuring and/or recording the temperature of a furnace (not shown) in the interior of which a thermocouple 3 is arranged in heat transfer relation therewith and which is responsive to slight changes in the temperature in the furnace. The thermocouple which may be located at a distance from the remainder of the measuring apparatus has its terminals connected by a pair of conductors 4 and 5 to the terminals of the potentiometric network 2 which preferably is of the null point type. The potentiometric network 2 includes a slidewire resistance 6 and an associated contact 7 which is capable of being moved along the length of the slidewire. It will be understood that the potentiometric network 2, illustrated schematically in Fig. 1, may be of any suitable type, for example, such as the Brown potentiometric network disclosed in Patent 2,150,502, issued to T. R. Harrison, E. H. Grauel and J. E. Kessler, on March 14, 1939.

The movable contact 7 of the potentiometric network 2 is attached to a suitable carrier which, for example, may be in the form of an internally threaded nut 8 adapted to ride on a screw threaded rod 9 which is rotated in one direction or the other under control of the thermocouple 3. A suitable motor 10 is provided and is coupled in any convenient manner to the screw threaded rod to rotate the latter at the desired speed and in the desired direction and thereby to move the contact 7 along the slidewire resistance 6 to rebalance the potentiometric network 2 whenever the latter is unbalanced. One terminal of the thermocouple 3 is connected directly to the left end of the slidewire 6 by the conductor 5 and the other terminal of the thermocouple is connected by the conductor 4 to one terminal 11 of an interrupter or converting device 12 described in detail hereinafter in connection with Fig. 2 and a second terminal 13 of the interrupter 12 is connected by a conductor 14 in which the primary winding 15 of a transformer 16 is inserted to the contact 7. The transformer 16 also includes a secondary winding 17 the terminals of which are connected to the input circuit of the electronic amplifier 1.

The interrupter 12 illustrated schematically in Fig. 1 and in greater detail in Fig. 2 operates to convert the potentiometer unbalanced direct currents into pulsating currents which are capable of being readily amplified. It will be understood that any desired form of interrupter may be employed but in order to illustrate an operative embodiment of the present invention the interrupter shown in detail in Fig. 2 may be employed, said interrupter consisting of a vacuum tube 18 in which metal contacts 11 and 13 are arranged. The tube 18 may desirably be formed of glass and has a diaphragm at one end which is resilient and integral with a rod 19 the latter of which has an end 20 normally resting against the underside of the contact 13 so that upon counter-clockwise rotation of the arm 19 about its pivot point, the resilient diaphragm in the end of tube 18, the contact 13 is raised out of engagement with the contact 11 to thereby break the circuit at that point. When rod 19 is rotated clockwise the contact 13 will move downward into engagement with the contact 11 to again close the circuit. The rod 19 is operatively connected by link 21 to a vibrator 22 which may be of an electro-magnetic type and as shown in Fig. 1 receives energizing current from alternating current supply lines $L^1$ and $L^2$ through a transformer 23 and a condenser 24. The alternating current supply lines may desirably, although not necessarily, be a source of 60-cycle current. The transformer 23 includes a primary winding 25 which has its terminals connected to the supply lines $L^1$ and $L^2$ and a secondary winding 26 whose terminals are connected in a circuit including the winding of the electromagnet 22 and the condenser 24.

On energization of the electromagnet 22 the contact 13 will alternately be raised and lowered thus intermittently breaking the circuit between the contacts. It is noted the electromagnet 22 may desirably be polarized so that the contacts 13 and 11 will be interrupted at the supply line frequency. The condenser 24 which is provided in the energizing circuit to the winding of the electromagnet 22 is desirably so proportioned that the current flow through the winding is substantially 90° out of phase with the voltage of the alternating current supply lines $L^1$ and $L^2$. The electromagnet 22 therefore interrupts the contacts 11 and 13 ninety degrees out of phase with the voltage of the alternating current supply lines $L^1$ and $L^2$. It will be understood that if desired mechanical tuning provisions may be made for thus effecting periodic separation of the contacts 11 and 13 ninety degrees out of phase with the voltage of the alternating voltage supply lines $L^1$ and $L^2$.

The periodic interruption of the unbalanced current which flows in the potentiometric network 2 upon an unbalanced condition of the latter produces a pulsating flow of direct current through a primary winding 15 of the transformer 16 and this flow of pulsating current through the transformer primary winding 15 causes the induction of an alternating current in the transformer secondary winding 17. This induced alternating voltage in transformer winding 17 is displaced 90° in phase in the other direction with respect to the voltage of the supply lines $L^1$ and $L^2$ when the potentiometric network 2 is unbalanced in the opposite direction. This alternating voltage induced in the transformer primary winding 17 is impressed on the input terminals of the electronic amplifier 1 wherein it is amplified and the amplified quantity is applied to the terminals of one winding 27 of the reversible motor 10, which as illustrated in detail in Fig. 3, also includes a winding 28 which is connected to the supply lines $L^1$ and $L^2$ through a suitable condenser 29.

In accordance with the present invention, the electronic amplifier 1 is designed so that there is a phase shift of substantially 90° between the voltage applied to the input circuit of the amplifier and the voltage which is obtained from the output circuit of the amplifier. To this end the electronic amplifier 1 may desirably be of the form illustrated in detail in Fig. 3.

As shown in Fig. 3 the electronic amplifier 1 comprises an electronic discharge tube 30 having a filament 31, an indirectly heated cathode 32, a control grid 33, a screen grid 34 and an anode 35. The cathode 32 is connected to the lower end of the transformer secondary winding 17 through a grid biasing resistor 36 and the control grid 33 is directly connected to the upper end of the transformer secondary winding 17.

Anode voltage is supplied the electronic discharge device 30 from a full wave rectifier 37 which includes a rectifier valve 38 having a pair of anodes 39 and 40 and a filament type cathode 41. The full wave rectifier 37 also includes the secondary winding 42 of a transformer 43 having a line voltage primary winding 44, the terminals of which are connected to the alternating current supply lines $L^1$ and $L^2$, and secondary windings 45, 46 and 47 in addition to the secondary winding 42. The secondary winding 47 is connected to and supplies energizing current to the filament type cathode 41. One terminal of the transformer secondary winding 42 is connected to the anode 39 and the other terminal thereof is connected to the anode 40. The filament cathode 41 comprises the positive terminal of the rectifier 37 and a center tap on the transformer secondary winding 42 comprises the negative terminal of the rectifier. The terminals of the rectifier are connected to the terminals of a divider resistance 48 through a suitable filter such as is indicated by the reference character 49. As shown in Fig. 3 the upper terminal of the voltage divider 48 is positive with respect to the lower terminal. A tap 50 on the divider 48 is connected by the conductor 51, in which a resistor 52 is inserted, to the anode 35 of the electronic discharge device 31, and the cathode 32 is connected through the biasing resistor 36 to a conductor 53 which is connected to a tap 54 on the voltage divider 48 which is negative with respect to the tap 50.

Voltage for the screen grid 34 is provided through a circuit which may be traced from the tap 50 to conductor 51, and a resistor 53A to the screen 34. A bleeder resistor 55 is connected between the screen grid 34 and the cathode 32 to aid in supplying the screen grid with the proper voltage. As illustrated the cathode 32 is heated by the filament 31 which is supplied with energizing current from the transformer secondary winding 45.

The output circuit of the electronic discharge valve 30 is coupled to the input circuit of a second electronic discharge valve 57 which has a filament type cathode 58, a control grid 59, a screen grid 60, a suppressor grid 61 and an anode 62. The filament cathode 58 is supplied with energizing current from the transformer secondary winding 46 and is shunted by a resistor 58A which has its mid point grounded for reducing hum.

The control grid 59 is connected to the upper end of an inductance coil 63 the lower end of which is connected to the lower end of the voltage divider 48. The anode 35 of the electronic discharge device 30 is coupled to a point intermediate the ends of the inductance coil 63 through a coupling condenser 64.

Anode voltage is supplied the electronic discharge device 57 from the voltage divider 48 through a circuit which may be traced from the upper terminal of the voltage divider 48 through a conductor 65 in which a resistor 66 is inserted to the anode 62, filament cathode 58, the mid point of resistor 58A, and conductor 53 to the terminal 54 on the divider 48. Screen voltage is supplied the discharge device 57 through a circuit which may be traced from the positive terminal of the voltage divider 48 to the conductor 65 and a resistor 67 to the screen 60.

The output circuit of the electronic discharge device 57 is coupled to the input circuit of an electronic discharge device 68 having a filament type cathode 69, a control grid 70, a screen grid 71, a suppressor grid 72 and an anode 73. The filament cathode 69 is shunted by a resistor 74 and is supplied with energizing current from the transformer secondary winding 46.

The control grid 70 is connected to the upper end of an inductance coil 75 the lower end of which is connected to the lower and negative end of the voltage divider 48. The anode 62 of the electronic discharge device 57 is coupled to a point on an inductance coil 75 intermediate its ends through a coupling condenser 76.

The anode 73 of the electronic discharge device 68 is connected through the primary winding 77 of an output transformer 78, having a secondary winding 79, to the positive terminal of the voltage divider 48, and the cathode 69 is connected through the resistor 74 and the grounded conductor 53 to the point 54 on the voltage divider. The screen grid 71 is connected through a resistor 80 to the positive terminal of the voltage divider 48.

In order to obtain the necessary phase shift in the electronic amplifier 1 and in order to obtain more efficient operation of the amplifier, the amplifier 1 is tuned to the frequency of the alternating voltage which is applied to the input terminals of the input transformer 16. This frequency, as noted above, may preferably be 60 cycles per second but need not necessarily be this frequency. The primary winding 77 of the output transformer 78 is tuned to the frequency of the input voltage by means of a condenser 81 which is shunted across the terminals of the primary winding 77.

The coupling stage between the electronic discharge devices 30 and 57 is tuned to the same frequency as that applied to the input circuit of the amplifier 1. The tuned coupling circuit may be traced from the upper end of the coupling resistor 52 through the coupling condenser 64, the inductance coil 63 to the lower and negative end of the voltage divider 48, the tap 50, conductor 51, and resistor 52 back to the condenser 64.

The values of the circuit components are so chosen that a phase shift of approximately 45° is obtained in this coupling circuit. It is noted that if the inductance coil 63 had no resistance and no distributed capacity the phase shift introduced by the coupling circuit would be approximately 90°, but it has been found in practice that a 90° phase shift by means of a single coupling circuit is difficult to obtain.

In order to obtain the desired 90° phase shift voltage within the amplifier 1, the second coupling stage between the electronic discharge devices 57 and 68 is provided. This coupling stage is tuned to the same frequency as that applied the input circuit of the transformer 16 and may be traced from the upper end of the coupling resistor 66 through the condenser 76, the inductance coil 75 to the lower and negative terminal of the voltage divider 48, from the upper and positive terminal of the voltage divider to the conductor 65 resistor 66 back to the condenser 76. A phase shift of approximately 45° in the same direction as that produced by the coupling circuit between the electronic discharge devices 31 and 57 is obtained in this second coupling circuit also. Since the phase shifts obtained by both the coupling circuits are in the same direction the total shift in the phase between the voltage applied to the input circuit of the amplifier and that obtained from the output circuit thereof will be approximately 90°.

The terminals of the secondary winding 79 of the output transformer 78 are connected directly to the terminals of the winding 27 of the reversible motor 10. Thus, the alternating current which is supplied to the motor winding 27 will be displaced 90° with respect to the alternating voltage which is applied to the input circuit of the electronic amplifier 1.

The reversible electrical motor 10 is of the induction variety and includes a squirrel cage rotor 82 and two pairs of oppositely displaced field poles (not shown) on which the windings 27 and 28 are wound. Winding 27 is wound on one pair of said field poles and winding 28 is wound on the other pair of said field poles. Due to the action of the condenser 29 which is connected in circuit with the winding 28, the current which flows through this latter winding will lead the line voltage by approximately 90°. Since the phase shift in the alternating voltage derived from the potentiometric network 2 is displaced 90° with respect to the voltage of the alternating current supply lines L¹ and L² by virtue of the operation of the interrupter 12 and the phase shift in this derived voltage is further shifted 90° by virtue of the operation of the electronic amplifier 1, the voltage obtained from the output circuit of the electronic amplifier 1 will be either in phase with the voltage of the supply lines L¹ and L² or displaced 180° therewith and consequently the current supplied the winding 27 by the electronic amplifier 1 is either in phase with the voltage of the alternating supply lines L¹ and L² or is displaced 180° therewith. This current in the winding 27 establishes a field through the rotor which is displaced 90° with respect to that established therein by the winding 28. Reaction between the field set up by the winding 27 with that set up by the winding 28 establishes a rotating field in the rotor which rotates in one direction or the other dependent upon whether the winding 27 is energized with alternating current in phase or displaced 180° in phase with respect to the voltage of the supply lines L¹ and L², and therefore, on the direction of unbalance of the potentiometric network 2. The motor rotor is connected through suitable gearing not shown to the screw threaded shaft 9 so that the contact 7 is adjusted along the slidewire resistance 6 in accordance with the direction of rotation of the rotor. The direction and duration of rotation of the rotor is controlled by the direction and extent of unbalance of the potentiometer so that on motor rotation the contact 7 is adjusted in the proper direction to reduce the potentiometer unbalance.

With the arrangement described it will be noted that any fluctuating or alternating electromotive forces of the same frequency as that of the supply lines L¹ and L² and in phase therewith which may be extraneously induced in the thermocouple circuit or in the potentiometric circuit will be impressed upon the input circuit of the electronic amplifier and a component thereof will appear in the output circuit of the electronic amplifier. While the interrupter 12 does chop up such extraneously induced voltages, it does not operate to shift the phase of such induced alternating voltages. The electronic amplifier 1, however, does operate to shift such induced alternating voltages by 90°. The result is that the alternating voltages so induced in the thermocouple 3 or potentiometric circuit 2 appear in the output circuit of the electronic amplifier as a voltage component which is displaced 90° in one direction or the other relatively to the voltage of the alternating current supply lines L¹ and L². This component of voltage is in phase with that supplied the motor winding 28 and consequently, is ineffective to operate the motor 10 for rotation. The arrangement described, therefore, operates to effectively eliminate alternating currents of the same phase and frequency as that supplied by lines L¹ and L² which may be extraneously induced in the thermocouple and potentiometer circuits, which alternating currents may be induced therein by stray alternating fields in the vicinity of the potentiometric recorder, for example, or in any other manner, without requiring the use of any additional apparatus.

In Fig. 4 I have illustrated, more or less diagrammatically, another arrangement in which the novel method of my present invention may be utilized to advantage. Fig. 4 discloses a deflectional type measuring system as distinguished from the self balancing potentiometric measuring system of Fig. 1. In Fig. 4 parts corresponding to those in Fig. 1 have been designated by the same reference numerals.

The thermocouple 3 in Fig. 4 is connected by conductors 4 and 5 in a series circuit including the interrupter 12 and the primary winding 15 of the transformer 16. The secondary winding 17 of transformer 16 is connected to the input circuit of amplifier 1 and the output terminals of the latter are connected to one phase winding 27A of an indicating electro-dynamometer 10A. A second phase winding 28A of the indicating electro-dynamometer 10A is connected through a condenser 29A to the alternating current supply lines L¹ and L².

The electro-dynamometer may desirably be constructed in a manner similar to that in which the motor 10 of Fig. 1 is constructed, but differs therefrom in that the rotor 82A is normally held by a spring 83 in a predetermined position. As shown, one end of the spring is connected to the rotor 82A and the other end thereof is anchored at 84. The rotor 82A carries a deflecting pointer 85 which is disposed in cooperative relation with a scale 86. When a voltage of a given polarity is produced at the thermocouple 3, the amplifier 1 impresses an alternating voltage of corresponding phase and magnitude on the electro-dynamometer winding 27A and the rotor 82A accordingly deflects in one direction or the other to a corresponding extent against the opposing action of the spring 83.

The scale 86 may desirably be calibrated in terms of current or voltage to thereby provide a direct indication of the current or voltage produced by the thermocouple 3. As shown, the scale 86 may desirably have its zero indication at the center thereof whereby an indication of the voltage or current produced by the thermocouple 3 may be had irrespective of the polarity of the voltage or current produced by the thermocouple 3.

As will be understood by those skilled in the art, any fluctuating or alternating electromotive forces of the same frequency as that of the supply lines L¹ and L² and in phase therewith which may be induced in the thermocouple circuit in the Fig. 4 arrangement will have no effect on the indication of the electro-dynamometer 10A by virtue of the method of operating the interrupter 12 which interrupts the thermocouple current to produce an alternating current which is displaced substantially 90° relatively to the voltage of the supply lines, and by virtue of the characteristic of the amplifier 1 in producing a phase shift of substantially 90° between the current applied to its input circuit and that obtained from its output circuit.

While in accordance with the provisions of the statutes, I have illustrated and described preferred embodiments of the present invention, those skilled in the art will understand that changes may be made in the form of the apparatus disclosed without departing from the spirit of my invention as set forth in the appended claims, and that some features of the present invention may sometimes be used with advantage, without a corresponding use of other features.

Having now described my invention what I claim as new and desire to secure by Letters Patent is:

1. The method of measuring a direct-current electrical quantity to eliminate the effects of spurious electrical currents of a predetermined frequency which are superimposed on said direct-current electrical quantity which comprises the steps of opposing said direct-current electrical quantity to a standard direct-current electrical quantity, translating only the resultant of said direct-current electrical quantities into a current of said predetermined frequency and shifted approximately 90° with respect to said spurious electrical currents, amplifying said spurious electrical currents and said resultant current and shifting both of the amplified quantities substantially 90° in phase, applying said amplified quantities to one phase winding of a two-phase device arranged to adjust said standard E. M. F., and applying a fluctuating current of the same phase and frequency as the resultant of said E. M. F.'s to the other phase winding of said device.

2. The method of measuring a direct-current electrical quantity to eliminate the effects of spurious electrical currents of a predetermined frequency which are superimposed on said direct-current electrical quantity which comprises the steps of translating said direct-current electrical quantity into a current of said predetermined frequency and shifted approximately 90° with respect to said spurious electrical currents, amplifying said spurious electrical currents and said resultant current and shifting both of said amplified quantities substantially 90° in phase, and applying said amplified quantities to a measuring device which is responsive only to currents of substantially the same phase as the component of said amplified quantities derived from said direct-current electrical quantity.

3. The method of measuring a direct-current electrical quantity to eliminate the effects of spurious electrical currents of predetermined frequency which are superimposed on said direct-current electrical quantity which comprises the steps of translating said direct-current electrical quantity into a fluctuating current of substantially the same frequency as said spurious electrical currents but displaced 90° in phase therefrom, and applying both the spurious electrical currents and the derived fluctuating current to a measuring device which is responsive only to currents of substantially the same phase as said derived fluctuating current.

4. In a measuring instrument including a potentiometer slidewire, a standard source of E. M. F. for said slidewire, means to connect a source of E. M. F. to be measured to said slidewire to oppose said standard E. M. F. to derive a resultant E. M. F., means to translate said resultant E. M. F. into a fluctuating current of the same frequency as a spurious electrical current superimposed thereon and the effects of which it is desired to eliminate, said fluctuating current being displaced 90° with respect to said spurious electrical current, means to amplify said derived fluctuating current and said spurious electrical current and to shift both of said currents 90° in phase, a phase responsive device to adjust said slidewire to balance said opposed E. M. F.'s, said phase responsive device including two phase windings, means to apply both of said amplified currents to one phase winding of said phase responsive device, and means to apply a fluctuating current of the same frequency and phase as said amplified spurious electrical current to the other phase winding of said device.

5. In a measuring instrument, a circuit including a direct-current electrical quantity to be measured, means for translating said direct-current electrical quantity into a fluctuating current of the same frequency as the frequency of a spurious electrical current superimposed thereon and the effects of which it is desired to eliminate, said fluctuating current being displaced 90° with respect to said spurious electrical current, means to amplify said fluctuating current and said spurious electrical current and to shift both of said currents 90° in phase, a device to indicate the magnitude of said direct-current electrical quantity, said device having a pair of phase windings, means to apply both of said amplified currents to one phase winding of said device, and means to apply a fluctuating current of the same frequency and phase as said amplified spurious electrical current to the other phase winding of said device.

6. In a measuring instrument, a circuit including a direct-current electrical quantity to be measured, means for translating said direct-current electrical quantity into a fluctuating current of the same frequency as the frequency of a spurious electrical current superimposed thereon and the effects of which it is desired to eliminate, said fluctuating current being displaced 90° with respect to said spurious electrical current, means to shift both of said currents 90° in phase, a device to indicate the magnitude of said direct-current electrical quantity, said device having a pair of phase windings, means to apply both of said shifted currents to one phase winding of said device, and means to apply a fluctuating current of the same frequency and phase as said shifted spurious electrical current to the other phase winding of said device.

7. The method of measuring a direct-current electrical quantity to eliminate the effects of spurious electrical currents of predetermined frequency which are superimposed on said direct-current electrical quantity which comprises the steps of opposing said direct-current electrical quantity to a standard direct-current electrical quantity, translating only the resultant of said direct-current electrical quantities into a fluctuating electrical current of the same frequency as said spurious electrical currents but displaced 90° in phase therefrom, and applying both the spurious electrical currents and the derived fluctuating current to a device which is responsive only to currents of substantially the same phase as said derived fluctuating current and is arranged to adjust said standard E. M. F.

8. The method of measuring a direct-current electrical quantity to eliminate the effects of spurious electrical currents of predetermined frequency which are superimposed on said direct-current electrical quantity which comprises the steps of opposing said direct-current electrical quantity to a standard direct-current electrical quantity, translating only the resultant of said direct-current electrical quantities into a fluctuating electrical current of the same frequency as said spurious electrical currents but displaced 90° in phase therefrom, amplifying said spurious electrical currents and said fluctuating current, applying both of the amplified quantities to one phase winding of a two phase device arranged to adjust said standard E. M. F., and applying a fluctuating current of the same phase and frequency as said amplified spurious electrical current to the other phase winding of said device.

9. In a measuring instrument including a potentiometer slidewire, a standard source of E. M. F. for said slidewire, means to connect a source of E. M. F. to be measured to said slidewire to oppose said standard E. M. F. to derive a resultant E. M. F., means to translate said resultant E. M. F. into a fluctuating current of the same frequency as a spurious electrical current superimposed thereon and the effects of which it is desired to eliminate, said fluctuating current being displaced 90° with respect to said spurious electrical current, means to amplify said derived fluctuating current and said spurious electrical current, a phase responsive device to adjust said slidewire to balance said opposed E. M. F.'s, said phase responsive device including two phase windings, means to apply both of said amplified currents to one phase winding of said phase responsive device, and means to apply a fluctuating current of the same frequency and phase as said amplified spurious electrical current to the other phase winding of said device.

10. In a measuring instrument, a circuit including a direct-current electrical quantity to be measured, means for translating said direct-current electrical quantity into a fluctuating current of the same frequency as the frequency of a spurious electrical current superimposed thereon and the effects of which it is desired to eliminate, said fluctuating current being displaced 90° with respect to said spurious electrical current, means to amplify said fluctuating current and said spurious electrical current, a device to indicate the magnitude of said direct-current electrical quantity, said device having a pair of phase windings, means to apply both of said amplified currents to one phase winding of said device, and means to apply a fluctuating current of the same frequency and phase as said amplified spurious electrical current to the other phase winding of said device.

11. In a measuring instrument, a circuit including a direct-current electrical quantity to be measured, means for translating said direct-current electrical quantity into a fluctuating current of the same frequency as the frequency of a spurious electrical current superimposed thereon and the effects of which it is desired to eliminate, said fluctuating current being displaced 90° with respect to said spurious electrical current, a device to indicate the magnitude of said direct-current electrical quantity, said device having a pair of phase windings, means to apply both of said currents to one phase winding of said device, and means to apply a fluctuating current of the same frequency and phase as said spurious electrical current to the other phase winding of said device.

HARRY S. JONES.